United States Patent
Beyerle, II et al.

(10) Patent No.: US 9,368,843 B2
(45) Date of Patent: Jun. 14, 2016

(54) BATTERY PACK ASSEMBLY

(71) Applicant: GrafTech International Holdings Inc., Parma, OH (US)

(72) Inventors: Richard Allen Beyerle, II, North Royalton, OH (US); Ian Andrew McCallum, Chagrin Falls, OH (US); Martin David Smalc, Parma, OH (US); Jonathan Andrew Taylor, Cleveland, OH (US); Ryan J. Wayne, Brecksville, OH (US)

(73) Assignee: GrafTech International Holdings, Inc., Independence, OH (US)

( * ) Notice: Subject to any disclaimer, the term of this patent is extended or adjusted under 35 U.S.C. 154(b) by 409 days.

(21) Appl. No.: 13/905,484

(22) Filed: May 30, 2013

(65) Prior Publication Data

US 2013/0323564 A1 Dec. 5, 2013

Related U.S. Application Data

(60) Provisional application No. 61/655,291, filed on Jun. 4, 2012.

(51) Int. Cl.
| | | |
|---|---|---|
| *H01M 6/50* | (2006.01) | |
| *H01M 10/60* | (2014.01) | |
| *H01M 10/647* | (2014.01) | |
| *H01M 10/617* | (2014.01) | |
| *H01M 10/613* | (2014.01) | |
| *H01M 10/6557* | (2014.01) | |
| *H01M 10/6555* | (2014.01) | |

(52) U.S. Cl.
CPC ............ *H01M 10/5032* (2013.01); *H01M 6/50* (2013.01); *H01M 6/5038* (2013.01); *H01M 10/5008* (2013.01); *H01M 10/60* (2015.04); *H01M 10/613* (2015.04); *H01M 10/617* (2015.04); *H01M 10/647* (2015.04); *H01M 10/6555* (2015.04); *H01M 10/6557* (2015.04)

(58) Field of Classification Search
CPC .............. H01M 10/6555; H01M 6/50–6/5088; H01M 10/60–10/627
See application file for complete search history.

(56) References Cited

U.S. PATENT DOCUMENTS

| | | | | |
|---|---|---|---|---|
| 5,756,227 | A * | 5/1998 | Suzuki et al. .................... | 429/62 |
| 6,027,807 | A * | 2/2000 | Inoue ...................... | F28F 21/02 |
| | | | | 297/180.12 |
| 2005/0056926 | A1* | 3/2005 | Chen ....................... | H01L 23/10 |
| | | | | 257/706 |
| 2007/0257359 | A1* | 11/2007 | Reis ......................... | H01L 23/34 |
| | | | | 257/723 |
| 2010/0279152 | A1* | 11/2010 | Payne ................ | H01M 10/5061 |
| | | | | 429/50 |
| 2013/0209858 | A1 | 8/2013 | Rainer Schmitt et al. | |

* cited by examiner

*Primary Examiner* — Scott J Chmielecki
(74) *Attorney, Agent, or Firm* — Rankin, Hill & Clark LLP

(57) ABSTRACT

A battery pack includes a plurality of prismatic format batteries in a stacked configuration. Flexible graphite sheet heat spreaders are interposed between adjacent prismatic batteries in the stack. A heat sink extends the length of the stack of prismatic format batteries. But heat spreader major surfaces contact the heat sink and extend into the heat sink by at least 30 percent of the thru-thickness of the heat sink.

17 Claims, 7 Drawing Sheets

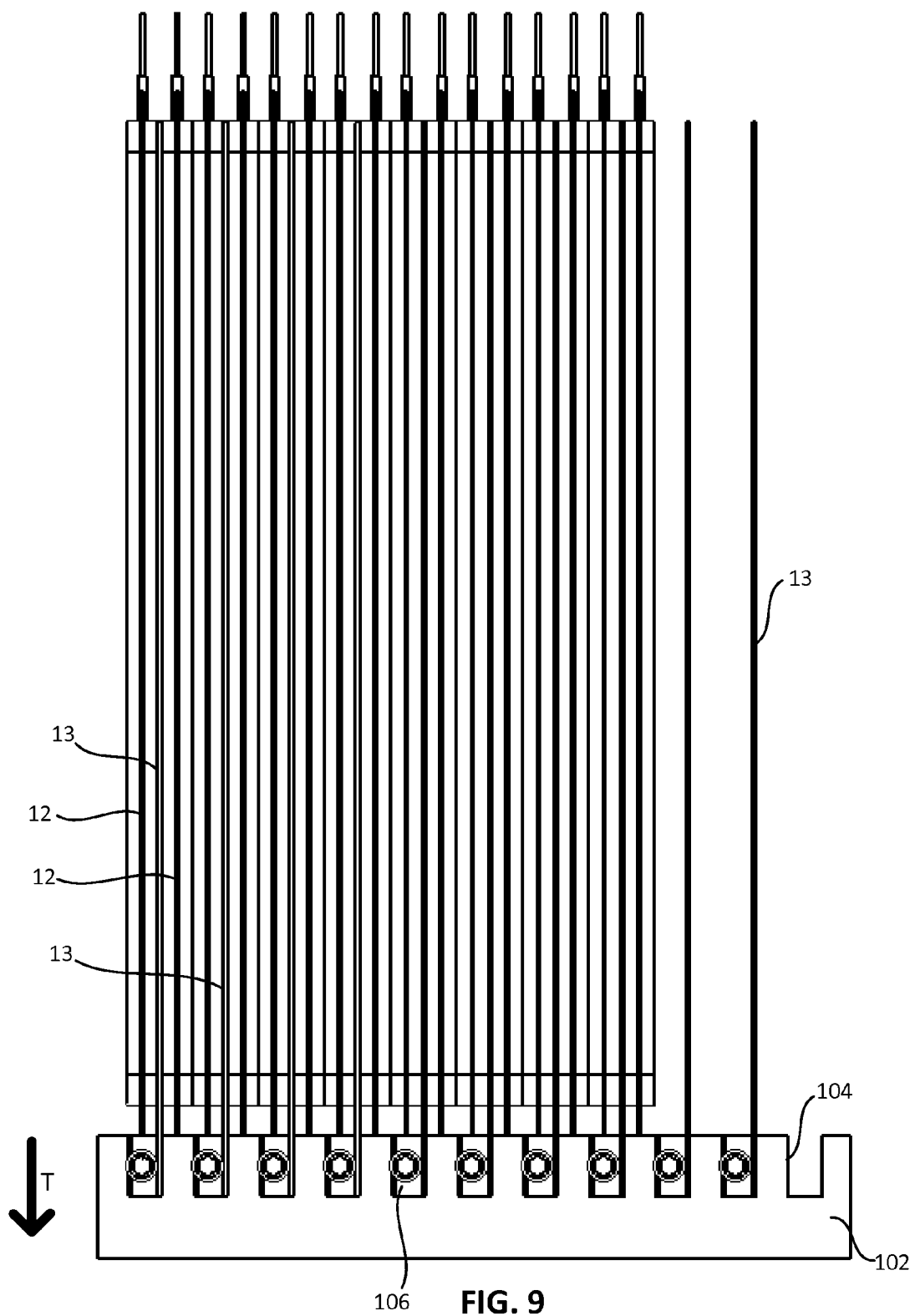

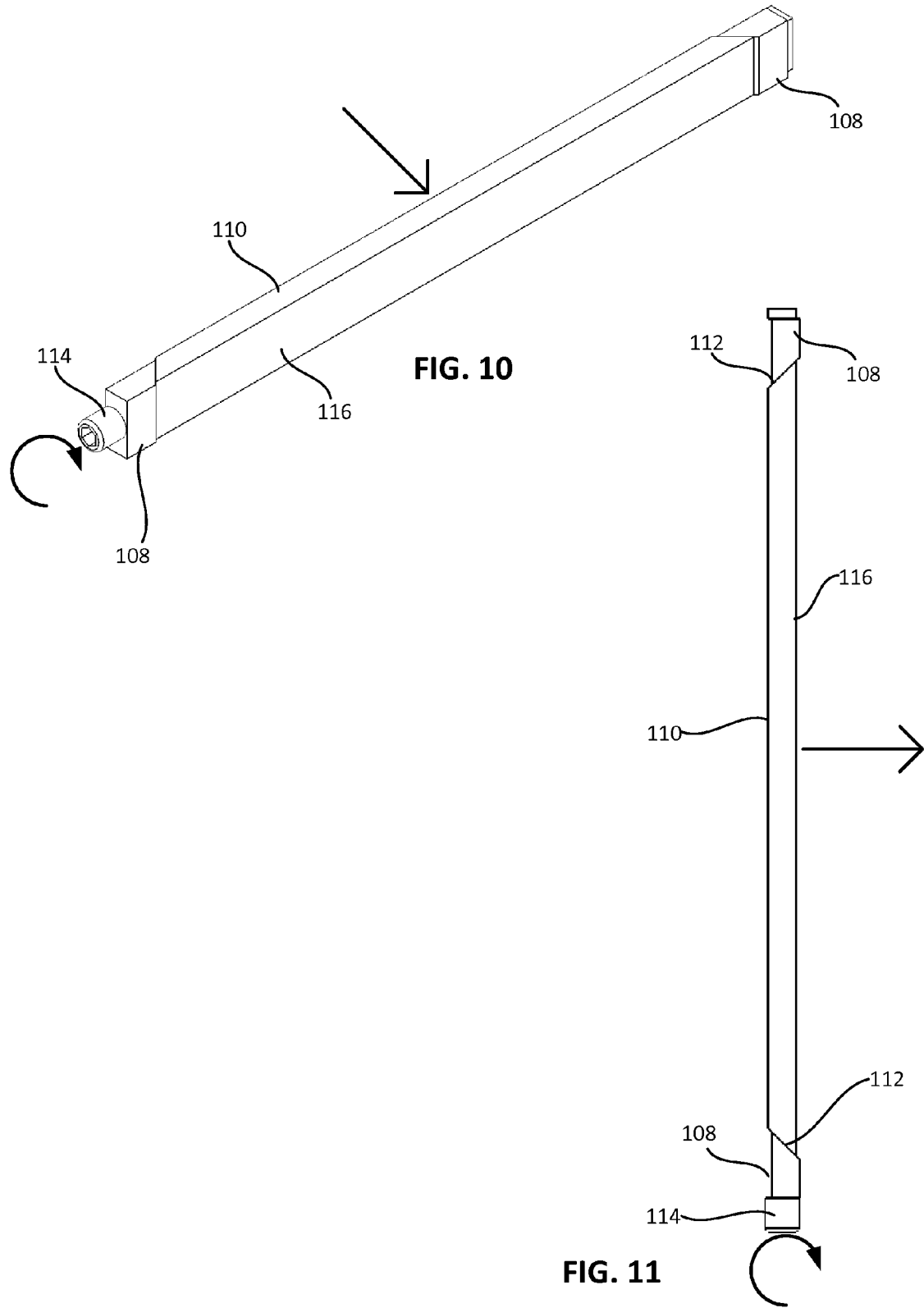

BATTERY PACK ASSEMBLY

This application claims the benefit of U.S. Provisional Application 61/655,291 filed Jun. 4, 2012, entitled Battery Pack Assembly, which is hereby incorporated herein in its entirety by reference.

BACKGROUND

With the ever steady push for cleaner and more efficient energy use, batteries and the capabilities they enable are becoming increasingly important. In particular, battery use in transportation and mass energy storage is growing. However, these higher intensity applications tend to generate greater amounts of heat and thus require a greater emphasis on thermal management.

Battery cells are typically formed with a pair of electrodes and an ion conducting electrolyte positioned therebetween. Battery packs are commonly formed by packing together multiple cells, thus enabling greater capacity and/or power. In particular, lithium ion batteries are becoming increasingly popular for automotive applications and various commercial electronic devices because they are rechargeable and have minimal memory effect.

Storing and operating battery cells at an optimal operating temperature is important to enable the battery to operate at its highest efficiency. Further, minimizing temperature extremes increases the usable life of the battery cell. Thus, opportunities exist to improve upon prior battery pack assemblies to enable optimal operating temperatures that ensure the longest possible life cycle, rated capacity, and nominal charge and discharge rates.

SUMMARY OF THE EMBODIMENTS

According to one aspect, a battery pack includes a plurality of prismatic format batteries in a stacked configuration. A plurality of heat spreaders are made from a flexible graphite sheet and are interposed between adjacent prismatic format batteries in the stack. Each heat spreader includes opposed major surfaces. A heat sink extends along the length of the stacked prismatic format batteries and includes a thru-thickness in a direction parallel to the major surfaces of the plurality of heat spreaders. Both heat spreader major surfaces contact the heat sink and the heat spreader extends into the heat sink at least 30 percent of the thru-thickness of the heat sink

BRIEF DESCRIPTION OF THE DRAWINGS

FIG. 9 is a side view of the battery pack of FIG. 8.

FIG. 10 is an isometric view of the locking assembly of the battery pack of FIG. 8.

FIG. 11 is a top view of the locking assembly of the battery pack of FIG. 8.

DETAILED DESCRIPTION OF THE EMBODIMENTS

Figure 1:
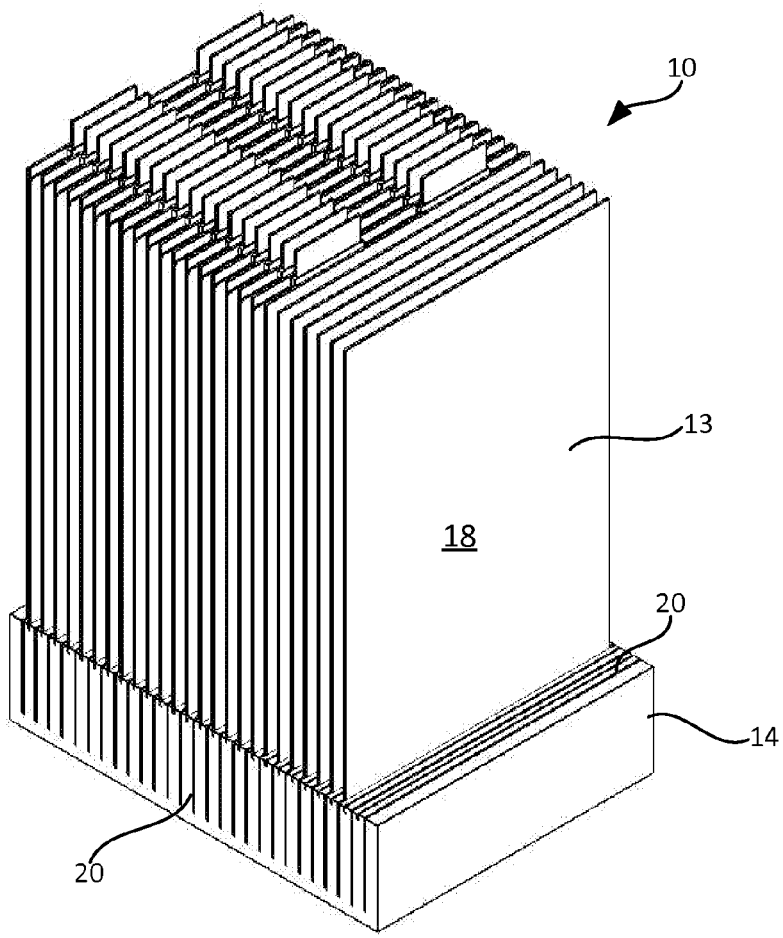
FIG. 1 is an isometric view of a battery pack assembly.

Prismatic lithium-ion cells have certain advantages over cylindrical cells and other battery formats. In particular, they have not only higher energy density, but the prismatic format also substantially simplifies assembly into multi-cell battery packs. Electrically, a battery pack assembly is made by assembling a plurality of prismatic lithium-ion cells in series to add up voltage, or in parallel which increases capacity.

In one embodiment, the prismatic lithium-ion cell is generally rectangular or square shaped and has a thickness of from about 1 mm to about 10 mm. More preferably, the cell has a thickness of from about 3 mm to about 6 mm. In one embodiment of the battery pack, the prismatic lithium-ion cell has opposed major surfaces, each major surface footprint being at least 8 square inches, more preferably a footprint of at least 16. In one embodiment, the footprint is from about 49 square inches to about 400 square inches. In another embodiment, the footprint is from about 16 square inches to about 2500 square inches and the most preferably a footprint is from about 50 square inches to about 200 square inches.

The case of each battery cell may be made of a hardened metal and/or plastic casing. Alternately, the case may be aluminum foil-laminated plastic film. The battery cell case is preferably made with aluminum foil-laminated plastic film, which has a thickness of from about 20 μm to about 200 μm. More preferably, the aluminum foil-laminated plastic film has a thickness of from about 30 μm to about 100 μm. Most preferably, aluminum foil-laminated plastic film has a thickness of from about 40 μm to about 50 μm. The positive electrode may be a lithium-ion positive electrode, the negative electrode may be a lithium-ion negative electrode and the electrolyte may be a lithium-ion electrolyte. Further, the electrolyte may be a liquid lithium-ion electrolyte or a polymer lithium-ion electrolyte.

Preferably, the lithium-ion cell has a specific energy density of greater than 200 wh/kg, more preferably greater than 210 wh/kg and the most preferably about 220 wh/kg or greater. In yet another embodiment, the lithium-ion cell has an energy density of at least 450 wh/L, preferably at least 500 wh/L, more preferably at least 510 wh/L and most preferably at least 520 wh/L. In still another embodiment, the lithium-ion battery pack has an energy storage capacity of at least 16 kWh, preferably at least 24 kWh, more preferably at least 53 kWh and most preferably at least 100 kWh.

As used herein, the term "cell" or "battery cell" means an electrochemical cell made of at least one positive electrode, at least one negative electrode, an electrolyte, and a separator membrane. The term "cell" and "battery cell" are used interchangeably. The "battery" or "battery pack" means an electric storage device made of more than two cells. The terms "battery" and "battery pack" are used interchangeably. It should further be appreciated that, though prismatic lithium ion type batteries are predominantly referred to herein, other types of batteries are contemplated.

Prismatic cells are advantageously assembled into battery packs in a stacked configuration, wherein the major surfaces of each cell are facing the major surfaces of adjacent cells. This stacked arrangement maximizes the energy density, but is not conducive to transferring the heat away from the cells. This is particularly true of the interior cells of the battery pack located relatively far from one of the exterior surfaces of the battery pack. To facilitate heat transfer, thermally conducting sheets or plates "heat spreaders" can be inserted in the spaces between the stacked prismatic cells. The heat spreaders improve performance and life of the cells by reducing thermal gradients in the plane of the sheet and transporting heat directly to the surroundings of the pack or to a heat sink as will be described in greater detail below.

With reference now to FIGS. 1-4, a battery pack is shown and generally indicated by the numeral 10. Battery pack 10 includes a plurality of battery cells 12 which, as can be seen, are arranged in a stacked configuration. Heat spreaders 13 are positioned between each battery cell 12. For clarity, in FIGS. 1-3, battery cells 12 are removed from the gaps between some of the heat spreaders 13 to more clearly show the arrangement thereof. In other embodiments, a heat spreader 13 is positioned between every other battery cell 12. In still other embodiments, heat spreaders 13 are positioned between battery cells 12 proximate to the center of the stack.

Battery pack 10 further includes a heat sink 14 extending adjacent to one side of the stack of battery cells 12. It should be appreciated that in this or other embodiments, the battery pack may be carried or contained in an outer housing (not shown) which may act to protect components from contamination, temperature, vibration, and/or shock. Accordingly, heat sink 14 may be integral to, or form a part of the outer housing.

In each of the embodiments herein, the heat sink may be a cold plate or manifold having pipes or other passageways through which a thermal transfer fluid flows. In other embodiments, the heat sink may not include a thermal transfer fluid, but instead includes surface features, such as fins, to increase effective surface area. In this or other embodiments, the heat sink may be made from a thermally conductive metal including, for example, copper or aluminum. In still further embodiments, the heat sink may be made from a graphite based material. In still further embodiments, heat sink may be made from compressed expanded natural graphite. In this or other embodiments, the compressed expanded natural graphite may be resin impregnated. In this or other embodiments, the heat sink may include phase change materials encapsulated or otherwise contained therein. In still other embodiments, the heat sink may comprise the external surface or housing of a device.

In each of the embodiments herein, heat spreader(s) 13 are interposed between at least one pair of adjacent battery cells 12 in the stack such that the opposed major surfaces 18 of the heat spreader 12 engages the major surfaces of adjacent battery cells 12. The heat spreaders 13 are advantageously interposed between every third battery cell 12, more advantageously between every two battery cells 12 and still more advantageously between each battery cell 12 in the stack. Advantageously, the heat spreader 13 contacts at least 70 percent of the major surface of the battery cell 12 facing the heat spreader 13. In other embodiments, the heat spreader 13 contacts at least 90 percent of the major surface of the battery cell 12 facing the heat spreader 13. In still further embodiments, the heat spreader 13 contacts substantially the entire major surface of the battery cell 12 facing the heat spreader 13. The heat spreaders 13 function to spread heat generated in the battery cells 12 to create a more uniform heat profile. Heat spreaders 13 further function to conduct thermal energy to heat sink 14.

Figure 2:
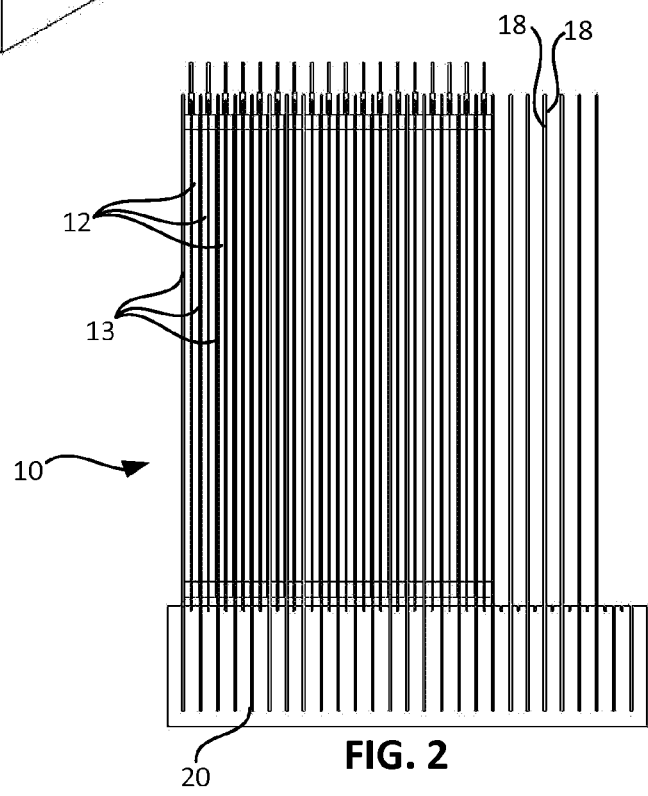
FIG. 2 is a side view of the battery pack assembly of FIG. 1.
Figure 3:
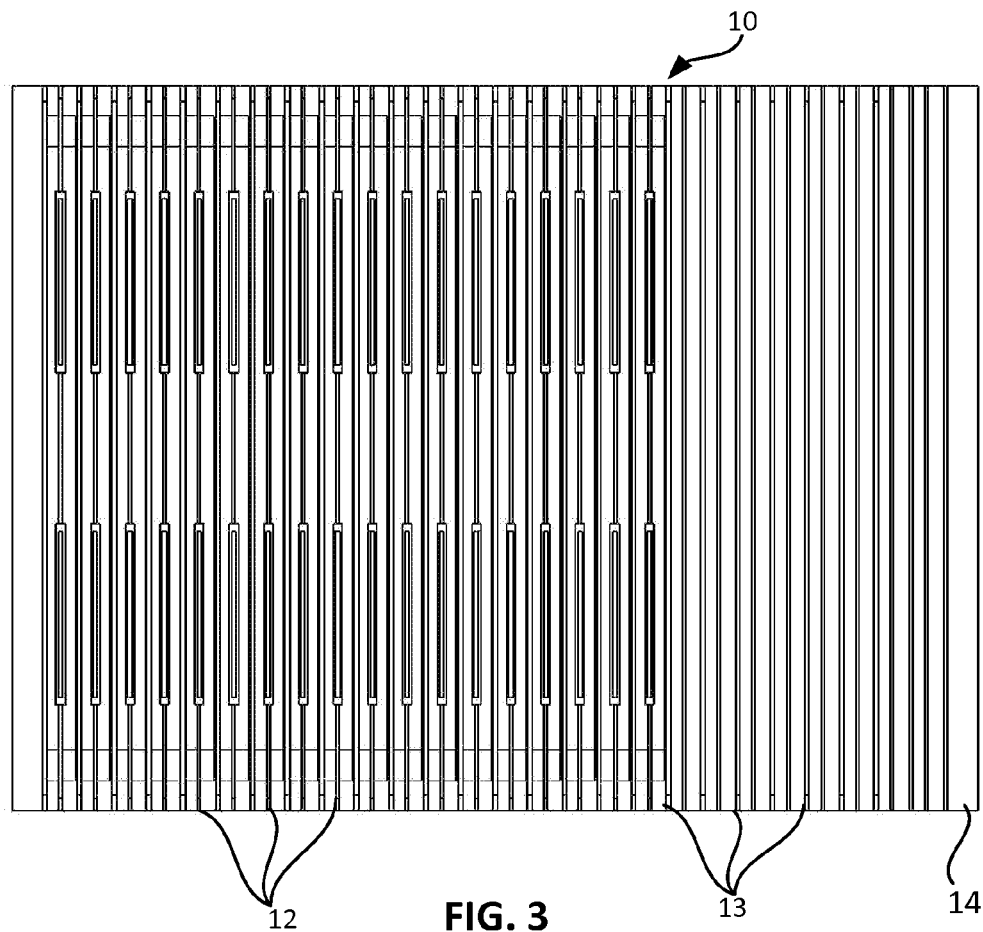
FIG. 3 is a top view of the battery pack assembly of FIG. 1.
Figure 4:
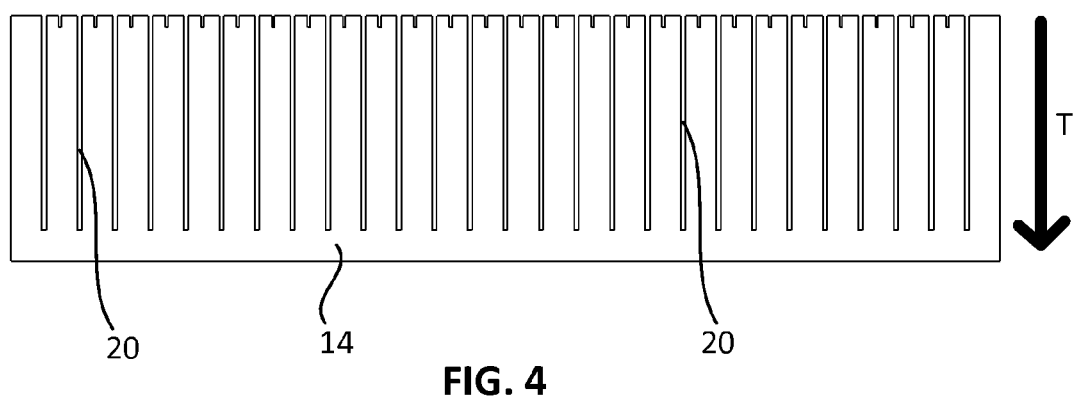
FIG. 4 is a side view of the heat sink of the battery pack assembly with batteries and heat spreaders removed.

With reference now to FIGS. 2-4, heat sink 14 includes a plurality of spaced parallel receiving channels 20 sized to receive heat spreader 13. Accordingly, a portion of the each heat spreader 13 is positioned in the receiving channels 20 and secured therein. Channels 14 may have a width that is the same as or slightly larger than the thickness of heat spreaders 13. Heat spreader 13 may be secured in channels 20 with, for example, an adhesive such as epoxy or acrylic. Advantageously, this configuration brings both sides of heat spreader 13 into contact with the heat sink 14 to maximize thermal transfer to the heat sink 14.

Each heat spreader 13 may be optionally thin and sheet-like, having two opposed major surfaces. In one embodiment, the heat spreader 13 may be less than about 2 mm thick. In other embodiments the heat spreader 13 may be less than about 1 mm thick. In still other embodiments, the heat spreader 13 may be less than about 0.5 mm thick. In one embodiment, the graphite sheet material may be from 10 to 1500 microns thick. In other embodiments the graphite sheet material may be from 20 to 40 microns thick. According to one or more embodiments, heat spreader 13 may be a sheet of a compressed mass of exfoliated graphite particles, a sheet of graphitized polyimide or combinations thereof.

Each heat spreader 13 may have an in-plane thermal conductivity of greater than about 250 W/mK at about room temperature (using the Angstrom method to test at room temperature being approximately 25° C.). In another embodiment the in-plane thermal conductivity of heat spreader 13 is at least about 400 W/mK. In yet a further embodiment, the in-plane thermal conductivity of heat spreader 13 may be at least about 550 W/mK. In additional embodiments, the in-plane thermal conductivity may range from about 250 W/mK to about 1500 W/mK. It should be appreciated that each heat spreader 13 may have the same or different in-plane thermal conductivities. Heat spreader 13 is advantageously highly anisotropic. Accordingly, heat spreader preferably has a thru-plane thermal conductivity of less than about 20 W/mK, more preferably less than about 10 W/mK, and still more preferably less than about 5 W/mK. In this or other embodiments, the thru-plane thermal conductivity is from between about 1 W/mK and about 10 W/mK. In this manner, though thermal energy is highly conductive in the in-plane direction (i.e. in the direction to draw thermal energy from the battery cell 12 to the heat sink 14) the relatively low thru-plane conductivity minimizes thermal energy transmission thru the heat spreader 13 from one battery cell 13 to an adjacent battery cell. Suitable graphite sheets and sheet making processes are disclosed in, for example, U.S. Pat. Nos. 5,091,025 and 3,404,061, the contents of which are incorporated herein by reference.

In an optional embodiment, one or more heat spreaders 13 may be resin reinforced. The resin may be used, for example, to increase the rigidity of the heat spreader 13 and/or the impermeability of heat spreader 13. In combination with resin reinforcement, or in the alternative, one or more heat spreaders 13 may include carbon and/or graphite fiber reinforcement. Heat spreader 13 may include a sufficient amount of reinforcement to assist with or provide structural integrity thereto.

Heat spreader 13 is a more conformable material than conventional materials used in a pack for heat spreading (ex. aluminum). Use of heat spreader 13 offers a reduction in interfacial thermal heat transfer resistance between heat spreader 13 and battery cell 12 as compared to battery cell 12 and a conventional material. Because heat spreader 13 is more conformable, interfacial thermal heat transfer between battery cells 12 having non-flat major surfaces is better than conventional materials. The conformability and the resulting reduction in interfacial thermal heat transfer resistance can reduce or even eliminate the need to apply a thermally conductive grease or paste to the surface of the heat spreader 13, as is commonly practiced to overcome the interfacial resistance of conventional materials.

Heat spreader 13 is a more compressible material than conventional materials used in a pack for heat spreading (ex. aluminum). Use of heat spreader 13 offers the ability to compensate for variations in the thickness of battery cells 12 that occur over time due to the effects of thermal expansion and aging. Because heat spreader 13 is more compressible than conventional heat spreading materials, the need to install compressible rubber "gap pads", as commonly practiced to compensate for cell dimensional changes is reduced or eliminated.

If inter-cell electrical isolation is desired, heat spreader 13 may optionally be coated with an electrically insulating film on one or both major surfaces, wherein the film is substantially thin enough not to appreciably impede heat transfer to the heat spreader 13. Exemplary films include PET and polyimide films.

In one embodiment, at least one of the spaces between heat spreader 13 and an adjacent battery cell 12 may be at least partially filled with a layer of a phase change material. In another embodiment at least one of the spaces between adjacent heat spreaders 13 or between the heat spreader 13 and an adjacent battery cell 12 is completely filled with a layer of a phase change material. In these or other embodiments, substantially all of the spaces between the heat spreaders 13 or between the heat spreaders 13 and the adjacent cells 12 include a phase change material. The phase change material may be free flowing and contained or bound at least partially by the heat spreaders 13. Alternately, the phase change material may be physically adsorbed into a carrying matrix. For example, the phase change material may be absorbed and carried in a compressed expanded graphite mat or carbon foam. The phase change material would help reduce the magnitude and speed of temperature changes in the battery pack. The melting temperature range of the phase change material may advantageously be approximately equal to the recommended operating temperature range for the battery cells within the battery pack. An example of a suitable phase change material is a paraffin wax.

In any one or more of the embodiments herein, the heat spreader 13 may further be a composite material. For example, each heat spreader may include a pair of graphite sheets having a phase change material disposed therebetween. The phase change material may be free flowing and contained or bound by the graphite sheets. Alternately, the phase change material may be physically adsorbed into a carrying matrix that is positioned between the opposed graphite sheets. For example, the phase change material may be absorbed and carried in compressed expanded graphite mat or carbon foam. In the alternative, the composite material may include a single graphite sheet layer secured to a single carrying matrix layer having the phase change material absorbed therein. In still other embodiments, heat spreader 13 may include a single layer of graphite sheet material having the phase change material absorbed therein.

Figure 5:
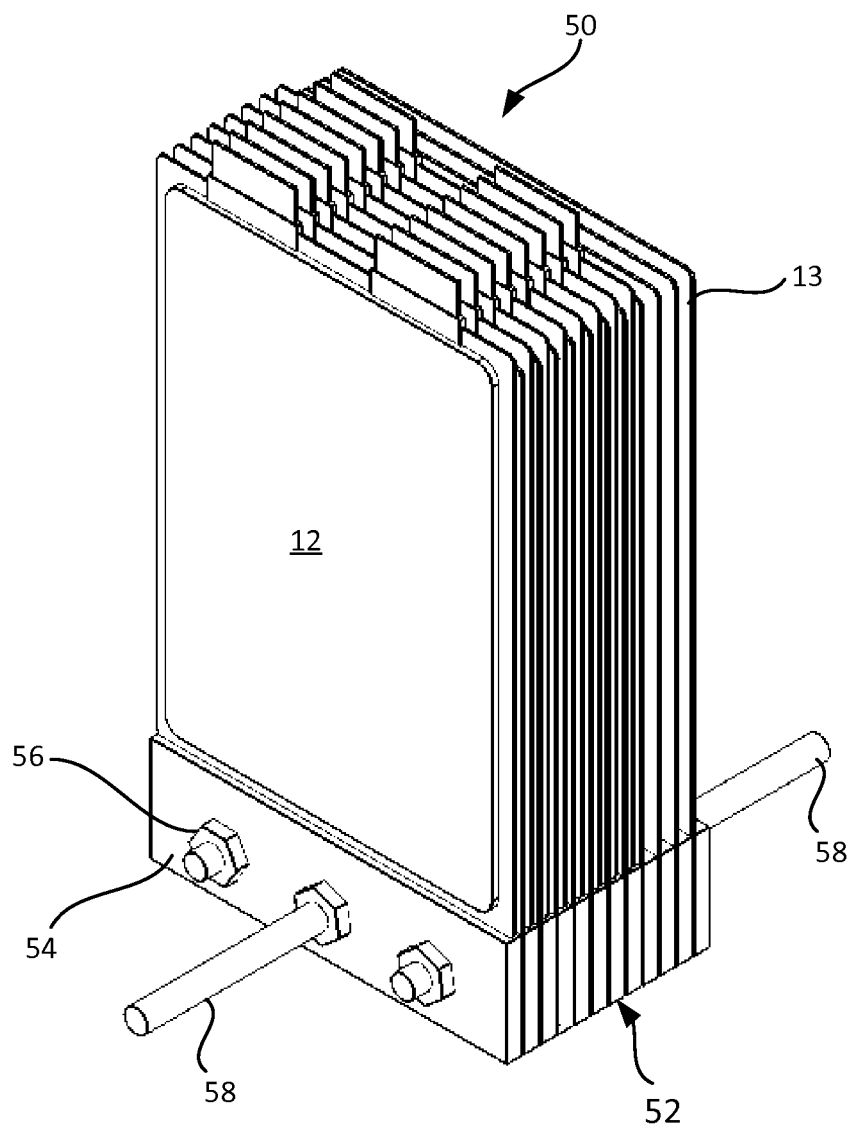
FIG. 5 is an isometric view of an alternate embodiment of a battery pack assembly.
Figure 6:
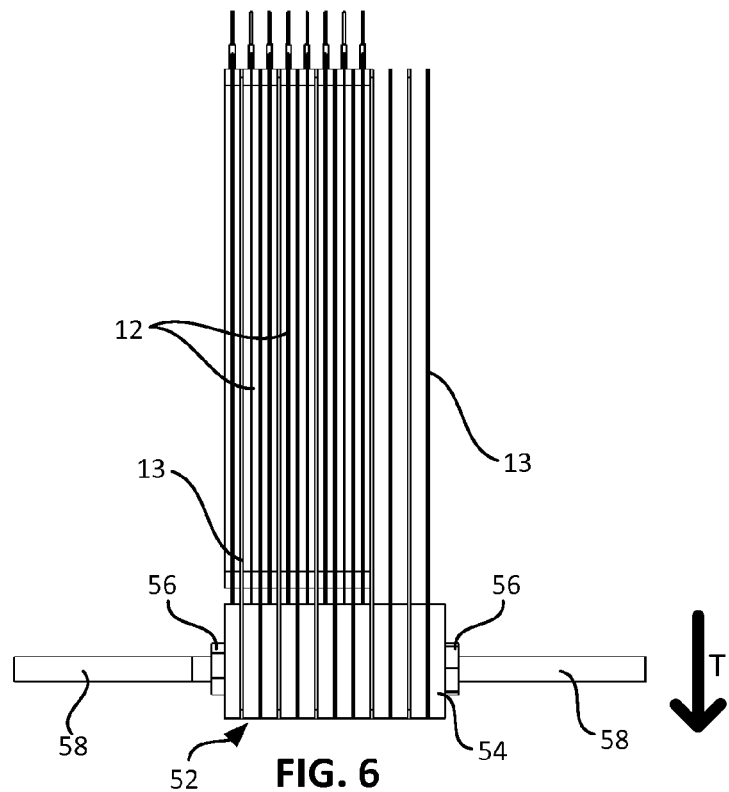
FIG. 6 is a right side view of the battery pack of FIG. 5 with mounting plates in the closed configuration.
Figure 7:
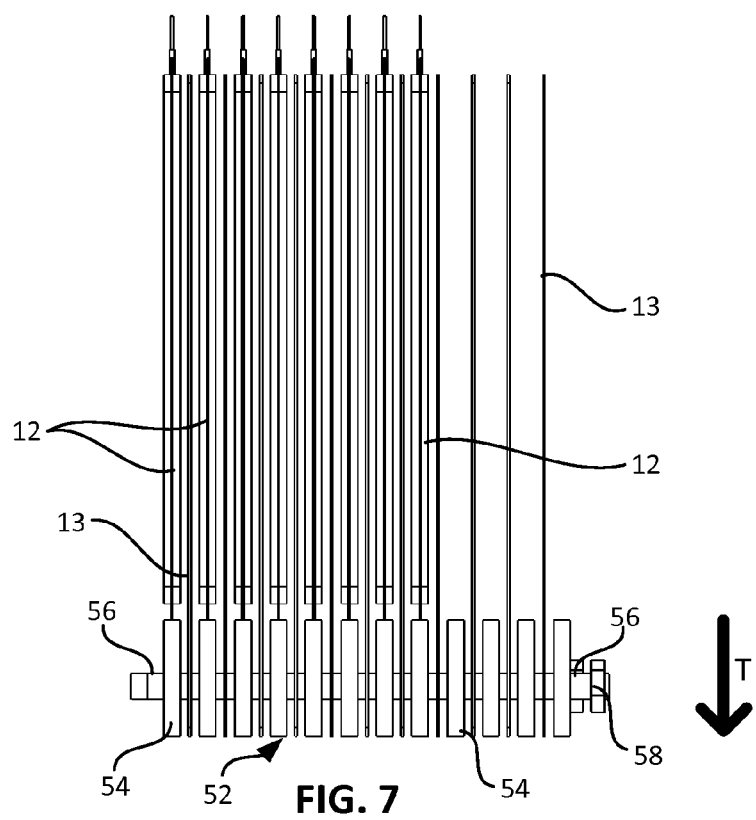
FIG. 7 is a right side view of the battery pack of FIG. 5 with mounting plates in the open configuration.
Figure 8:
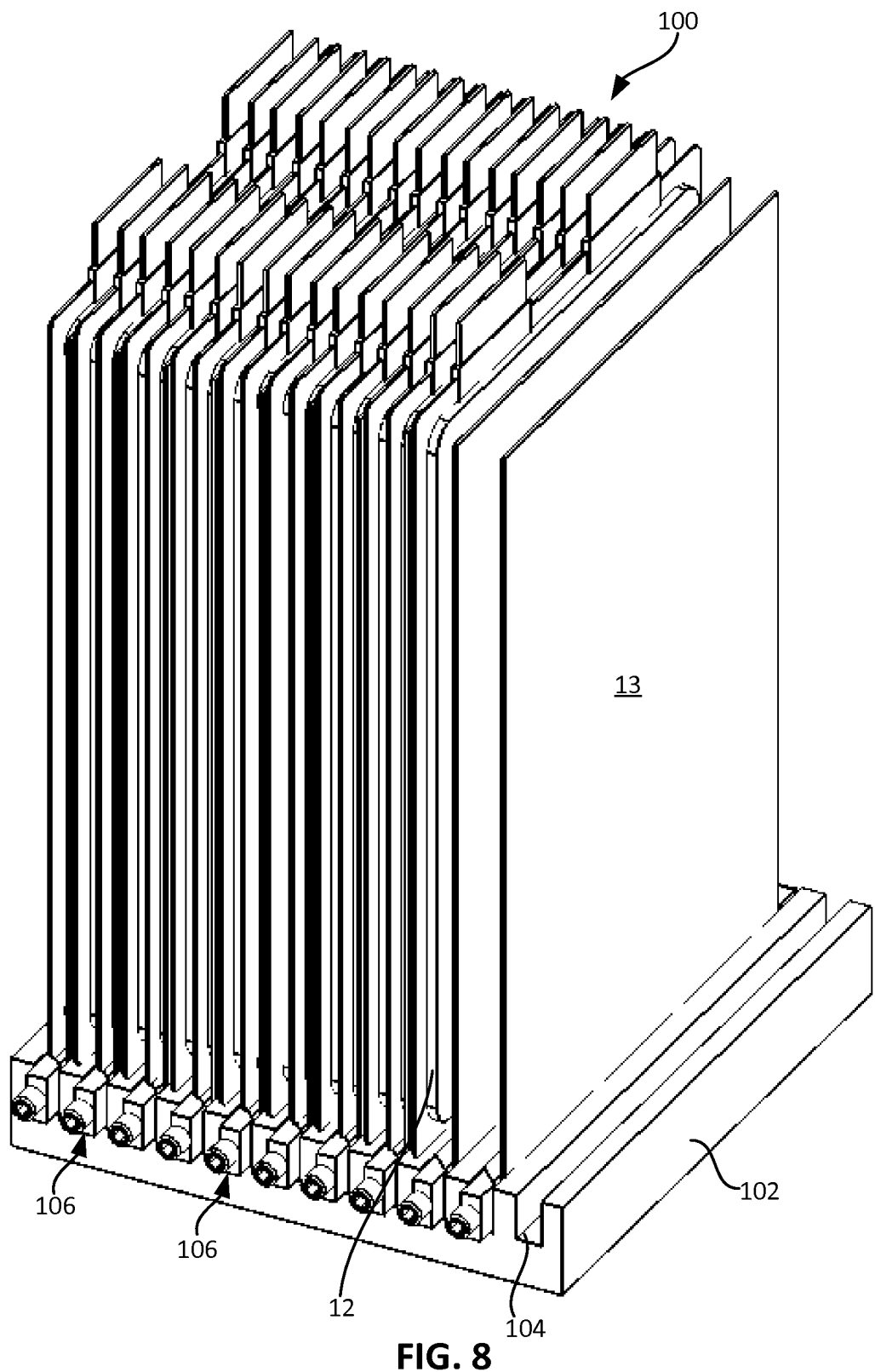
FIG. 8 is an isometric view of a second alternate embodiment of a battery pack assembly.

With reference now to FIGS. 5-7 an alternate embodiment of a battery pack is shown and generally indicated by the numeral 50. It should be appreciated that like numbers indicate like elements. Battery pack 50 includes a plurality of battery cells 12 which, as can be seen, are arranged in a stacked configuration. Heat spreaders 13 are positioned between each battery cell. For clarity, in FIGS. 5-7, battery cells 12 are removed from the gaps between some of the heat spreaders 13 to more clearly show the arrangement thereof. In other embodiments, a heat spreader 13 is positioned between every other battery cell 12. Battery pack 50 further includes a heat sink 52 extending adjacent to one side of the stack of battery cells 12.

Heat sink 52 is formed from a plurality of individual plate sections 54 that may be compressed together by means of, for example, fasteners 56 at the opposed ends of one or more mounting bar(s) 58 which extend at least the length of the battery cell stack. For example, mounting bars 58 may have threaded end portions, and compression could be accomplished by rotating correspondingly threaded mechanical fasteners 56. Each plate section 54 and heat spreader 13 may include one or more thru-holes or notches configured to receive mounting bar 58. In this manner, the plate sections 54 and heat spreaders 13 may slide thereon, simplifying alignment and easing assembly. Accordingly, FIGS. 5 and 6 show the battery pack 50 in the compressed assembled configuration and FIG. 7 shows the battery pack 50 in the uncompressed configuration as might be the case during assembly of the battery pack 50.

Mounting bar 58 may be solid or hollow. In one embodiment, mounting bar(s) 58 may be configured to carry a thermal transfer fluid therein. For example, relatively cool fluid may be directed through one or more mounting bars(s) 58 to remove thermal energy transferred to the plate sections 54 by heat spreaders 13.

Each plate section 54 includes a generally planar contact surface 60 on opposed sides thereof for engaging heat spreaders 13. When in the compressed assembled configuration, heat spreaders 13 are compressed between adjacent plate sections 54 and thereby form an effective thermal interface with the contact surfaces 60 of adjacent plate section(s) 54. Advantageously, heat spreader 13 engages at least 50 percent of the surface area of adjacent contact surfaces 60, more preferably at least 75 percent of the surface area of adjacent contact surfaces 60 and still more preferably substantially 100 percent of the surface area of adjacent contact surfaces 60. In this or other embodiments, at the side of plate section 54 opposed from battery cell 12, heat spreader 13 may extend beyond plate section 54 to function as a heat sink fin to increase the surface area available for natural or forced convection.

With reference now to FIGS. 8-11, an alternate embodiment of a battery pack is shown and generally indicated by the numeral 100. It should be appreciated that like numbers indicate like elements. Battery pack 100 includes a plurality of battery cells 12 which, as can be seen, are arranged in a stacked configuration. Heat spreaders 13 are positioned between every other battery cell. For clarity, in FIGS. 8 and 9, battery cells 12 are removed from the gaps between some of the heat spreaders 13 to more clearly show the arrangement thereof. In other embodiments, a heat spreader 13 is positioned each battery cell 12. Battery pack 100 further includes a heat sink 102 extending adjacent to one side of the stack of battery cells 12 along the edges of the major surface(s) of the heat spreaders 13.

Heat sink 102 includes a plurality of spaced parallel channels 104 sized to receive a portion of heat spreader 13 therein as well as a fastening mechanism 106 for securing the heat spreader 13 in the channel 104. With particular reference to FIGS. 10 and 11, fastening mechanism may be in the form of a wedge clamp formed of a pair of wedge shaped end pieces 108 and a central engaging member 110 having angled surfaces 112 on opposed ends thereof. A threaded connector 114 extends through the wedge clamp so that rotation thereof draws the wedge end pieces 108 inwardly. As the wedge end pieces 108 move inwardly, the central engaging member 110 is forced laterally relative to the wedge end pieces 108. Thus, heat spreader 13 and fastening mechanism 106 may be inserted into channel 104. Thereafter, threaded connector 114 may be rotated to cause the wedge end pieces 108 to move inwardly. This in turn causes an engaging surface 116 of central engaging member 110 to engage heat spreader 13 to force it against the side wall of channel 104.

Thus, in the above embodiments, the major surface(s) of the heat spreader 13 engages the major surfaces of adjacent battery cells 12. Heat is spread by heat spreaders 13 as well as conducted to the heat sink, wherein the above described interface between heat sink and heat spreader advantageously provides efficient heat transfer to the heat sink. Indeed, in any of the above embodiments, advantageously at least 5 percent, more advantageously at least 10 percent and still more advantageously at least 20 percent of the surface area of the heat spreader 13 engages heat sink 14/52/102. By providing both increased surface area contact with the heat sink as well as contacting the heat sink with both sides of the heat spreader 13, improved thermal performance can be achieved.

Still further advantage is achieved by the penetration of the heat spreader into the heat sink as opposed to contacting the exterior of the heat sink. In this manner, the thermal transfer into the body of the heat sink is optimized. In each of the above embodiments the heat sink includes a thru-thickness T in a direction parallel to the major surfaces of the heat spreaders 13 and battery cells 12. In any one of the above embodiments, advantageously, the heat spreader extends into the heat sink at least 30 percent of the thru-thickness of the heat sink, more advantageously at least 50 percent of the thru-thickness of the heat sink, still more advantageously at least 75 percent of the thru-thickness of the heat sink. In these or other embodiments that the heat spreader may extend into the heat sink from between about 50 percent of the thru-thickness of the heat sink to about 100 percent of the thru-thickness of the heat sink.

The disclosures of all cited patents and publications referred to in this application are incorporated herein by reference in their entirety. The various embodiments disclosed herein may be practiced in any combination thereof. The above description is intended to enable the person skilled in the art to practice the invention. It is not intended to detail all of the possible variations and modifications that will become apparent to the skilled worker upon reading the description. It is intended, however, that all such modifications and variations be included within the scope of the invention that is defined by the following claims. The claims are intended to cover the indicated elements and steps in any arrangement or sequence that is effective to meet the objectives intended for the invention, unless the context specifically indicates the contrary.

What is claimed is:

1. A battery pack comprising:
   a plurality of prismatic format batteries in a stacked configuration;
   a plurality of heat spreaders made from a flexible graphite sheet, each said heat spreader being interposed between adjacent of said prismatic format batteries in said stack, each said heat spreader having opposed major surfaces; and
   a heat sink extending along the length of the stacked plurality of prismatic format batteries, wherein said heat sink includes a plurality of plate sections and at least one mounting bar, said plate sections being carried on said at least one mounting bar and said heat sink includes a thru-thickness in a direction parallel to said major surfaces of said plurality of heat spreaders, wherein both said heat spreader major surfaces contact said heat sink and said heat spreader extends into said heat sink at least 30 percent of said thru-thickness of said heat sink.

2. The battery pack of claim 1 wherein said flexible graphite sheet comprises a sheet of a compressed mass of exfoliated graphite particles.

3. The battery pack of claim 1 wherein said flexible graphite sheet comprises graphitized polyimide.

4. The battery pack of claim 1 wherein said flexible graphite sheet includes an in-plane thermal conductivity of at least about 250 W/mK.

5. The battery pack of claim 1 wherein said flexible graphite sheet includes an in-plane thermal conductivity of at least about 400 W/mK.

6. A battery pack comprising:
   a plurality of prismatic format batteries in a stacked configuration;
   a plurality of heat spreaders, each said heat spreader being made from a flexible graphite sheet, each said heat spreader being interposed between adjacent prismatic format batteries in said stack, each said heat spreader having opposed major surfaces;
   a heat sink extending along the length of the stacked plurality of prismatic format batteries, wherein said heat sink includes a plurality of channels and said heat sink includes a thru-thickness in a direction parallel to said major surfaces of said plurality of heat spreaders, wherein both said heat spreader major surfaces contact said heat sink and said plurality of heat spreaders extend into said plurality of channels in said heat sink at least 30 percent of said thru-thickness of said heat sink; and
   a fastening mechanism securing said plurality of heat spreaders in said plurality of channels.

7. The battery pack of claim 6 wherein each said heat spreader includes a thickness and each said plurality of channels include a width and each said heat spreader thickness is substantially the same as each said channel width.

8. The battery pack of claim 6 wherein said heat spreaders are secured in said channels by an adhesive.

9. The battery pack of claim 6 wherein said fastening mechanism comprises a pair of wedge shaped end pieces, a central engaging member having angled surfaces on opposed ends thereof and a threaded connector extending through said fastening mechanism so that rotation thereof draws said wedge end pieces inwardly and forces said central engaging member laterally relative to said wedge end pieces.

10. The battery pack of claim 6 wherein said plate sections are compressed together by means of a pair of fasteners positioned at opposed ends of said at least one mounting bar.

11. The battery pack of claim 6 wherein said each said plate section and said heat spreader includes at least one thru-hole or notch configured to receive said mounting bar.

12. The battery pack of claim 6 wherein each said plate section includes a generally planar contact surface for engaging said heat spreaders, and wherein said heat spreader engages at least 50 percent of said planar contact surface.

13. The battery pack of claim 6 wherein said heat spreader engages at least 75 percent of said planar contact surface.

14. The battery pack of claim 6 wherein said flexible graphite sheet comprises a sheet of a compressed mass of exfoliated graphite particles.

15. The battery pack of claim 9 wherein said flexible graphite sheet comprises graphitized polyimide.

16. The battery pack of claim 6 wherein said flexible graphite sheet includes an in-plane thermal conductivity of at least about 250 W/mK.

17. The battery pack of claim 6 wherein said flexible graphite sheet includes an in-plane thermal conductivity of at least about 400 W/mK.

\* \* \* \* \*